Patented May 4, 1937

2,079,480

UNITED STATES PATENT OFFICE 2,079,480

WELDING ROD AND THE LIKE

Irving T. Bennett, Rome, N. Y., assignor to Revere Copper and Brass Incorporated, Rome, N. Y., a corporation of Maryland No Drawing. Application September 23, 1935, Serial No. 41,781

9 Claims. (Cl. 219—8)

My invention relates to welding bodies such as welding rods for use in building up and conditioning metal parts as, for example, reconditioning worn locomotive axles, bearings, bushings, hub-liners, and the like, by building them up and shaping them.

This application is a continuation in part of my copending application Serial Number 31,622, filed July 16, 1935, which is a continuation in part of my copending application Serial Number 16,816, filed April 17, 1935.

Heretofore it has been proposed to recondition worn parts by building them up by depositing thereon so-called "weld metal", employing for this purpose a welding rod and any suitable process effective progressively to melt the end portion of the rod and bond the molten metal to the part, and, after the part is gradually built up in this way and cooled, to machine it to the desired shape and size.

In the attempt to condition metal parts in this way it has been found that known metals suitable for welding are difficult to machine, especially after being subjected to the welding operation for building up the part. Further, it has been found that weld metals heretofore proposed have the defect of presenting poor bearing metals due to the tendency of the bearing made of them to "seize" or "grab" as it is commonly termed.

Applicant has found, that by suitably incorporating uncombined lead into the melt of which the part is built up, the same may be readily machined, although such metal containing lead it has been found would be unsuitable for ordinary welding purposes because lead would act to weaken the strength of the welded joint uniting the parts welded together. Further, the uncombined lead it has been found acts to prevent so-called "seizing" or "grabbing" in the bearing, probably because its action is in the nature of a lubricant.

In the practice of the invention, the base metal of which the part is built up is such that it will not alloy with lead, in order that the lead may exist as minute globules distributed or dispersed throughout the metal. Copper and certain copper-content alloys it has been found are admirably suited for this purpose because lead, which practically is insoluble in copper, alloys with them with difficulty, if at all. The built up part therefore according to the invention consists of copper or a copper-base alloy with which is mechanically mixed, as distinguished from alloyed, a relatively small percentage of lead distributed throughout the metal. Satisfactory results will ordinarily be secured with appreciable amounts of lead, say about 1% thereof, up to about 5 or 6% when depositing on ferrous parts such as steel, although for some uses, particularly when depositing on non-ferrous parts such as copper alloys, the amount of lead may be advantageously increased up to about 20%.

Conveniently, the welding rod consists of copper or a copper-base alloy which can be hot worked and has the lead mechanically associated with it in some way other than by introducing the lead into the melt of which the rod material is formed. Preferably this is done by hot rolling a lead-free copper or copper-base alloy into rods, or it may be done by hot rolling the metal into sheets, say about ⅜" thick, and shearing the sheets to form rods of approximately square cross-section, the opposite sides being left rough as the result of the shearing operations. The rod, however formed, may be coated with lead to form a composite welding rod by dipping it into molten metal or spraying it with it, the roughened surfaces of the rod when sheared causing a greater amount of lead to adhere than would otherwise be the case. For a rod of given weight, a square or other polygonal cross-section of the rod it will be understood provides a greater surface area for adherence of the lead than would otherwise be the case if the rod were circular in cross-section. For causing adherence of the lead to the rod, especially when it is dipped in molten lead, the lead may contain a small amount of tin, say about 1 to 5% thereof with relation to the lead, this tin ordinarily dissolving in the copper or copper-base of the weld metal when the rod is melted by the depositing operation.

It will be understood that the lead may be mechanically associated with the copper or copper-base alloy in other ways to form the composite welding rod as, for example, by employing tubing with a lead filler; or the copper or copper-base rod may be coated with lead by wrapping the rod with lead tape, or by drawing or extruding a lead tube over the rod, or by electro-depositing a coating of lead upon the rod; or the lead may be associated with the copper or copper-base alloy by any of the known methods of forming composite rods.

It is also possible to coat the rod with lead dust, or other forms of comminuted lead, mixed with a binder to make the lead adhere to the rod. Such a coating may be formed by mixing lead dust with a sufficient amount of sodium or potassium silicate and water, say two-thirds potassium silicate and one-third water, to form a paste of the consistency of a rather thick paint, which paste may be applied to the rod by dipping it into the paste, or by use of a brush.

It is also possible to coat a copper rod, or one formed of a copper-content alloy, with a coating having separate layers of lead and tin, or with a lead-tin, lead-silver, lead-antimony, or other lead-content alloy, and upon melting of the rod the tin, or other non-lead constituents, will ordinarily dissolve in the copper or copper-base while the lead will be distributed through the mass as a mechanical mixture with it. For convenience in terminology these lead alloys are referred to as "reducible alloys". It is possible in some instances that the distributed lead will contain a little of the tin or other constituent soluble in lead. However, so far as effective results have been observed, this does not reduce the efficacy of the dispersed lead. It will therefore be understood that a lead-tin or other alloy of lead and a constituent highly soluble in copper will be materially if not wholly reduced to what in effect amounts to free lead. It will be understood that the amounts of lead and tin employed in these examples will be such as to incorporate into the metal deposited on the metal part the percentages of lead and tin herein elsewhere specified, and that in this way additional lead and tin may be added to the alloy or mixture of which the body of the rod is formed when said alloy or mixture already contains these metals.

Preferably the operation of building up the metal part by use of the above described welding rods is performed by depositing the rod thereon by arc-depositing the material of the rod by use of the so-called "carbon arc" process, although, if desired, it may be performed by use of the so-called "electric metallic arc" process. During the operation of building up the part by these processes a small amount of lead is melted with the fractions of the rod being deposited and is dispersed and finely divided by the arc and mixed with the weld metal.

It has been found that if the base metal of the rod is in the form of a copper-base alloy containing silicon dispersion of the lead throughout the weld metal is improved, and an excellent bond is obtained, particularly to ferrous parts, bonding to which is rendered difficult with lead present in the weld metal. This copper-base alloy, if desired, may contain from 0.01 to 6% silicon, with the balance copper.

Instead of employing binary silicon-copper, small amounts of other metals, such as tin, nickel, iron, zinc, phosphorus and manganese, may be added. From 0.005 to 0.1% phosphorus will give satisfactory results when added to the binary silicon-copper when the same is to be hot worked, and up to 0.5% when it is to be cold worked, whereas if the rods are to be cast as much as 10% phosphorus may be employed. For the hot workable alloys from 0.5 to 2% manganese added to the binary alloy will give satisfactory results, particularly when from 3 to 4% silicon is present.

The amount of tin which may be added to the binary silicon-copper alloy may range from approximately 0.1 to 15% if the rod is cast, but, if the alloy is to be hot workable, should not exceed approximately 3% and should be proportioned to the amount of silicon to impart that property. For example, if the alloy is to be both hot and cold workable, the silicon preferably should not exceed approximately 4.7% if the tin is above 0.25%, while the maximum amount of tin for any value of silicon up to 3% preferably should not exceed about 2%, and with the silicon between 3 and 4.7% the maximum amount of tin should vary between approximately 0.9 and 2% roughly inversely and linearly with the amount of silicon. If desired, this alloy also may contain 0.005 to 0.1% phosphorus for improving its welding properties, and, if desired, up to 1% zinc for improving its workability.

It will be understood that within the scope of the appended claims wide deviations may be made from the above described welding rods and copper-content alloys without departing from the spirit of the invention.

I claim:

1. A composite welding rod of at least two elements in definite juxtaposed substantially segregated relation, one of which is a copper-base alloy containing 0.01 to 6% silicon and the other material of the group comprising lead and reducible lead alloy, the total amount of lead chemically presented by the rod being approximately 1 to 20% of the metallic constituents thereof and being predominantly contained in the material of said group, said rod linearly thereof having a substantially uniform metallic chemical composition.

2. A welding rod according to claim 1 chemically presenting 1 to 5% lead.

3. A welding rod according to claim 1 in which the copper-base alloy contains 0.1 to 3% tin, the latter being so proportioned to the silicon as to cause the copper-base alloy to be both hot and cold workable.

4. A welding rod according to claim 1 chemically presenting 1 to 5% lead, and in which the copper-base alloy contains 0.1 to 3% tin, the latter being so proportioned to the silicon as to cause the copper-base alloy to be both hot and cold workable.

5. A welding rod according to claim 1 in which at least the bulk of the material of said group is contained in a coating on an elongated body of said alloy.

6. A welding rod according to claim 1 in which at least part of the lead presented is contained in a coating of lead or lead-tin alloy on an elongated body of the copper-base alloy.

7. A welding rod according to claim 1 in which at least part of the lead presented is in the form of a tube of lead or lead-tin alloy drawn or extruded over a rod of the copper-base alloy.

8. A welding rod according to claim 1 in which the copper-base alloy contains 0.1 to 3% tin, the latter being so proportioned to the silicon as to cause the copper-base alloy to be both hot and cold workable, and the lead presented is in the form of a tube of lead or lead-tin alloy drawn or extruded over a rod of the copper-base alloy.

9. A welding rod according to claim 1 in which the silicon is from about 2 to 4.7% and the copper-base alloy contains from about 0.25 to 2% tin, the latter being so proportioned to the silicon as to cause the copper-base alloy to be both hot and cold workable, and the lead presented is contained in a coating of lead or lead-tin alloy on a rod of the copper-base alloy.

IRVING T. BENNETT.